C. M. HARMSEN.
CULTIVATOR ATTACHMENT.
APPLICATION FILED AUG. 25, 1916.

1,289,164.

Patented Dec. 31, 1918.

Witnesses

Inventor
C. M. Harmsen,
By Victor J. Evans
Attorney

UNITED STATES PATENT OFFICE.

CHARLES M. HARMSEN, OF WILTON JUNCTION, IOWA.

CULTIVATOR ATTACHMENT.

1,289,164. Specification of Letters Patent. Patented Dec. 31, 1918.

Application filed August 25, 1916. Serial No. 116,888.

*To all whom it may concern:*

Be it known that I, CHARLES M. HARMSEN, a citizen of the United States, residing at Wilton Junction, in the county of Muscatine and State of Iowa, have invented new and useful Improvements in Cultivator Attachments, of which the following is a specification.

This invention relates to an attachment for cultivators, the object of the invention being to provide an attachment which may be connected with the gang frame yoke and is provided with a circular and rotatable member for arrangement adjacent the forward shovel to serve as a shield to prevent young plants from being covered or broken by the dirt thrown up by the shovel when the cultivator is in use.

Another object of the invention is to provide the atttachment with a circular shield which is so constructed that when the cultivator is in use the earth turned up by the shovel may pass through the shield and onto the roots of the young plants while clods and the like, will be broken in their passage through the shield or deflected away from the plants.

With these and other objects in view, the invention resides in the novel combination and arrangement of parts, which will be hereinafter described and particularly pointed out in the claim.

I therefore reserve the right to make any changes as fairly fall under the scope of my claim without the changing of my invention.

The preferred embodiment of the invention has been illustrated in the accompanying drawing, although no restriction is necessarily made to the precise details of construction therein shown, as changes, alterations, and modifications, within the scope of the claim may be resorted to when desired.

Like characters of reference denote corresponding parts throughout the several views in the drawing, in which.

Figure 1:
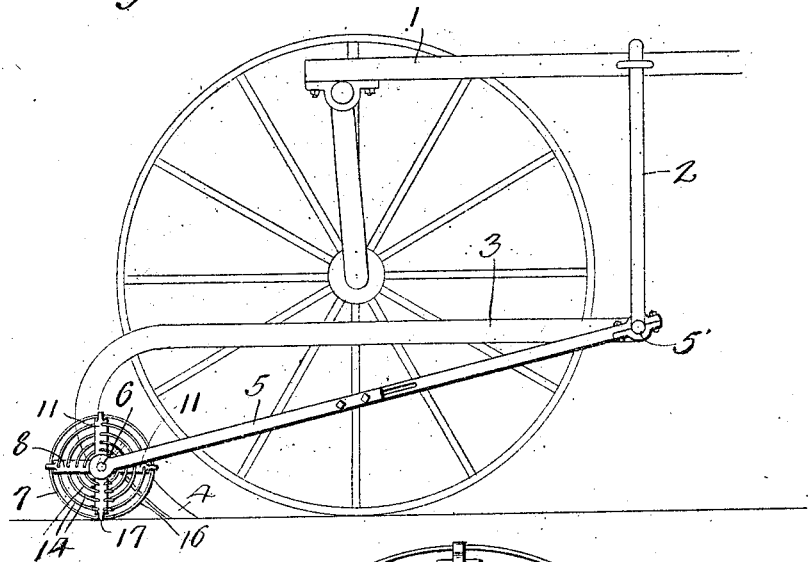
Figure 1 is a vertical longitudinal sectional view through a portion of the cultivator showing the attachment connected therewith.
Figure 2:
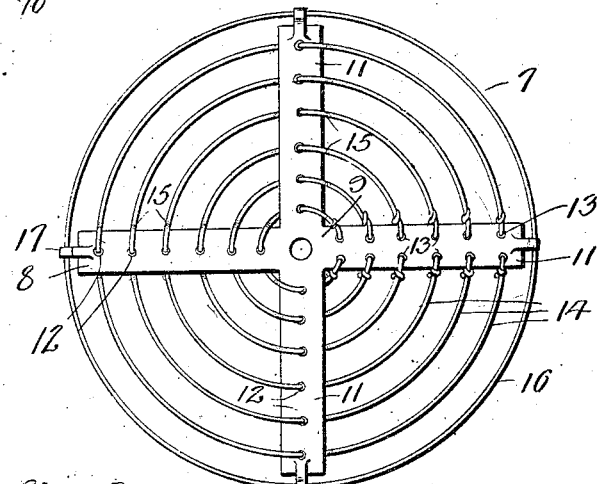
Fig. 2 is a view in elevation of the attachment showing the same disconnected from the cultivator.
Figure 3:
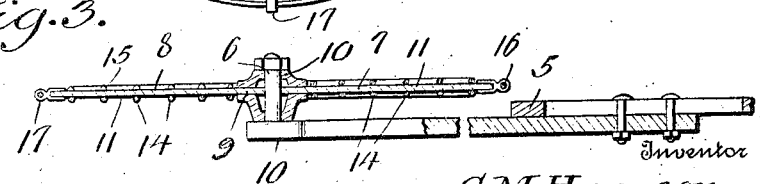
Fig. 3 is a horizontal transverse section on the line 3—3 of Fig. 2.

Referring now to the drawing in detail, the numeral 1 designates a portion of a cultivator of the double-row type to the gang frame yoke 2 of which is connected a gang frame 3 having connected therewith the shanks of shovels 4 in the usual manner.

An extensible arm 5 has one end pivotally connected with the gang frame yoke 7 and its other end provided with a stub shaft 6 arranged at right-angles to said arm and receiving thereon a circular and reticulated shield 7 arranged adjacent the forward shovel 4 on the gang frame 3 and rotatable upon the stub shaft 6 through the contact of the shield 7 with the ground with which it is held in engagement by the weight of the arm 5.

The shield or fender comprises a frame 8 formed with a central portion 9, and four radially extending arms 11. The frame is mounted on shaft 6 supported in bearings 10, and one of the arms is provided with a double row of apertures 13, the remaining arms having a single row of apertures 12. A plurality of independent curved wires or rods form a series of concentric and approximately annular elements or members 14, the ends of the separate wires being connected with that radial arm having the apertures 13. The wires pass through correspondingly located apertures of the remaining arms, entering at one side of a given arm, and passing thence from the opposite side to the next arm. Corresponding edges of the arms are unobstructed, and the wires 14 are offset or deflected at 15 adjacent to the apertures 12 through which they pass. These offset or deflected portions tend to maintain the wires in their original position and relieve strain on the end connections of said wires.

A tread element 16 is secured to the ends of the radial arms by means of eye members 17.

With an attachment constructed as above described and connected with a cultivator as shown in Fig. 1 in the drawing, it will be seen that when the cultivator is in use, the earth thrown up by the forward shovels 4 is directed against the reticulated shield 7 through which said earth may pass and fall upon the roots of the plants while clods or lumps of earth which would tend to break or injure the plants would be broken through their contact with the bands 14 and the rotation of the shield or deflected away from the plants.

From the foregoing description, taken in connection with the accompanying drawing, it is at once apparent that an attachment for a cultivator has been provided which is simple in construction, therefore inexpensive of manufacture, although highly efficient in use.

Having thus described the invention, what is claimed as new, is:

In a device of the class described, a frame including a plurality of arms radiating from a common center, an eye member carried by the end of each arm, a tread element passing through all of the eye members and extending circumferentially of the device, a plurality of concentric members of approximately annular form having end portions approaching each other and connected with one of the arms, the remaining arms being each provided with a series of apertures, and the concentric members passing through corresponding apertures in each series, and from a given side of each arm to the opposite side of an adjacent arm and being offset near the respective arms, corresponding edges of the arms being unobstructed.

In testimony whereof I affix my signature.

CHARLES M. HARMSEN.

Copies of this patent may be obtained for five cents each, by addressing the "Commissioner of Patents, Washington, D. C."